United States Patent [19]

Vlasbloem-van den Boezem

[11] Patent Number: 5,368,513
[45] Date of Patent: Nov. 29, 1994

[54] METHOD FOR MANUFACTURING A CORRECTION MASK FOR AN IMAGE INTENSIFIER TUBE OF THE PROXIMITY-FOCUS TYPE HAVING AN OBLONG CATHODE AND ANODE, AND ALSO A METHOD FOR CORRECTING AN IMAGE INTENSIFIER TUBE

[75] Inventor: Netty E. Vlasbloem-van den Boezem, Maasland, Netherlands

[73] Assignee: BV Optische Industrie "de Oude Delft", Delft, Netherlands

[21] Appl. No.: 844,639
[22] PCT Filed: Sep. 26, 1990
[86] PCT No.: PCT/EP90/01642
§ 371 Date: Apr. 15, 1993
§ 102(e) Date: Apr. 15, 1993
[87] PCT Pub. No.: WO91/05364
PCT Pub. Date: Apr. 18, 1991

[30] Foreign Application Priority Data

Oct. 2, 1989 [NL] Netherlands ............ 8902442

[51] Int. Cl.$^5$ ............ H01J 31/50; H01J 9/44
[52] U.S. Cl. ............ 44/3; 445/28; 359/888; 313/526; 313/532
[58] Field of Search ............ 445/3, 28, 63; 359/888; 313/532, 526

[56] References Cited

U.S. PATENT DOCUMENTS 3,149,968 9/1964 Stephens ............ 359/888
4,187,002 2/1980 Roziere ............ 359/888

FOREIGN PATENT DOCUMENTS 1105195 11/1955 France ............ 359/888
52-47672 4/1977 Japan ............ 359/888
1562093 3/1980 United Kingdom .
2042255 9/1980 United Kingdom .

OTHER PUBLICATIONS

G. W. Hobgood, Jr., *IBM Tech. Discl.*, vol. 14, No. 11 (Apr. 1972) p. 3324.

Primary Examiner—P. Austin Bradley
Assistant Examiner—Jeffrey T. Knapp
Attorney, Agent, or Firm—Louis E. Marn

[57] ABSTRACT

A method is described for manufacturing a correction mask for an image intensifier tube of the proximity-focus type having an oblong cathode and anode. Such image intensifiers tend to have a non-uniform light output at the anode in response to a uniform input image at the cathode. A measurement is made of the light output distribution along at least one line at the anode under uniform illumination of the cathode, which measurement is used to manufacture a transparency for attachment on the output window of the image intensifier tube. The transparency is provided with a light absorbing line, which line absorbs more light at those positions along the length of the output window where the light output was higher. The absorbence of the light absorbing line is made proportional to the difference between the actual light output and required value light output, whereby the light output of the image intensifier tube is equalized to a required level.

14 Claims, 3 Drawing Sheets

METHOD FOR MANUFACTURING A CORRECTION MASK FOR AN IMAGE INTENSIFIER TUBE OF THE PROXIMITY-FOCUS TYPE HAVING AN OBLONG CATHODE AND ANODE, AND ALSO A METHOD FOR CORRECTING AN IMAGE INTENSIFIER TUBE

The invention relates to a method for manufacturing a correction mask for an image intensifier tube of the proximity-focus type having an oblong cathode and anode.

An oblong image intensifier tube of the proximity-focus type is described in the Dutch Patent 183,914. Such oblong image intensifier tubes are frequently used in so-called slit radiography apparatuses. The cathode is in that case sensitive to X-ray radiation, while the anode provides an output image corresponding to the incident X-ray radiation via an anode window which may possibly comprise an optical fibre plate. In such an application, the anode and the cathode may have a length of, for example, 40 cm and a width of, for example, 4 cm.

In practice the problem arises that it is difficult to make such long image intensifier tubes which have a uniform conversion factor over the entire active surface. Conversion factor is understood to mean the ratio between the radiation incident at the cathode side and the resultant output radiation at the anode side. It is also possible for the conversion factor to alter locally during the service life of such an image intensifier tube as a consequence of ageing phenomena.

There is therefore a need for a facility enabling correction of an oblong image intensifier tube so that the conversion factor is, so to speak, equalized.

The object of the invention is to provide such a facility. To this end, a method for manufacturing a correction mask for an image intensifier tube of the proximity-focus type having an oblong cathode and anode is characterized, according to the invention, in that the cathode is essentially uniformly illuminated over the entire surface with radiation to which the cathode is sensitive; in that during the illumination of the cathode, the intensity of the light provided by the anode is measured in at least one narrow strip-type region, extending in the longitudinal direction of the anode, as a function of the distance from one of the ends of the anode; in that the measured values obtained in this way for each strip-type region are reproduced in a graph as an experimental curve; in that a required value line approximating to the experimental curve is determined for each experimental curve; in that the difference between the experimental curve and the required value line is determined as a function of the distance from one of the ends of the anode; in that a transparent carrier is manufactured which is provided, in at least one oblong region, with a blackening which represents the difference between an experimental curve and an associated required value line as a function of the distance from one of the ends of the anode.

A method for correcting an image intensifier tube of the proximity-focus type having an oblong cathode and anode and an anode window matching the anode is characterized, according to the invention, in that a strip-type transparent carrier which is provided with a blackening in at least one oblong region is placed as a mask against the anode window.

The invention will be described in greater detail below with reference to the attached drawing.

Figure 1:
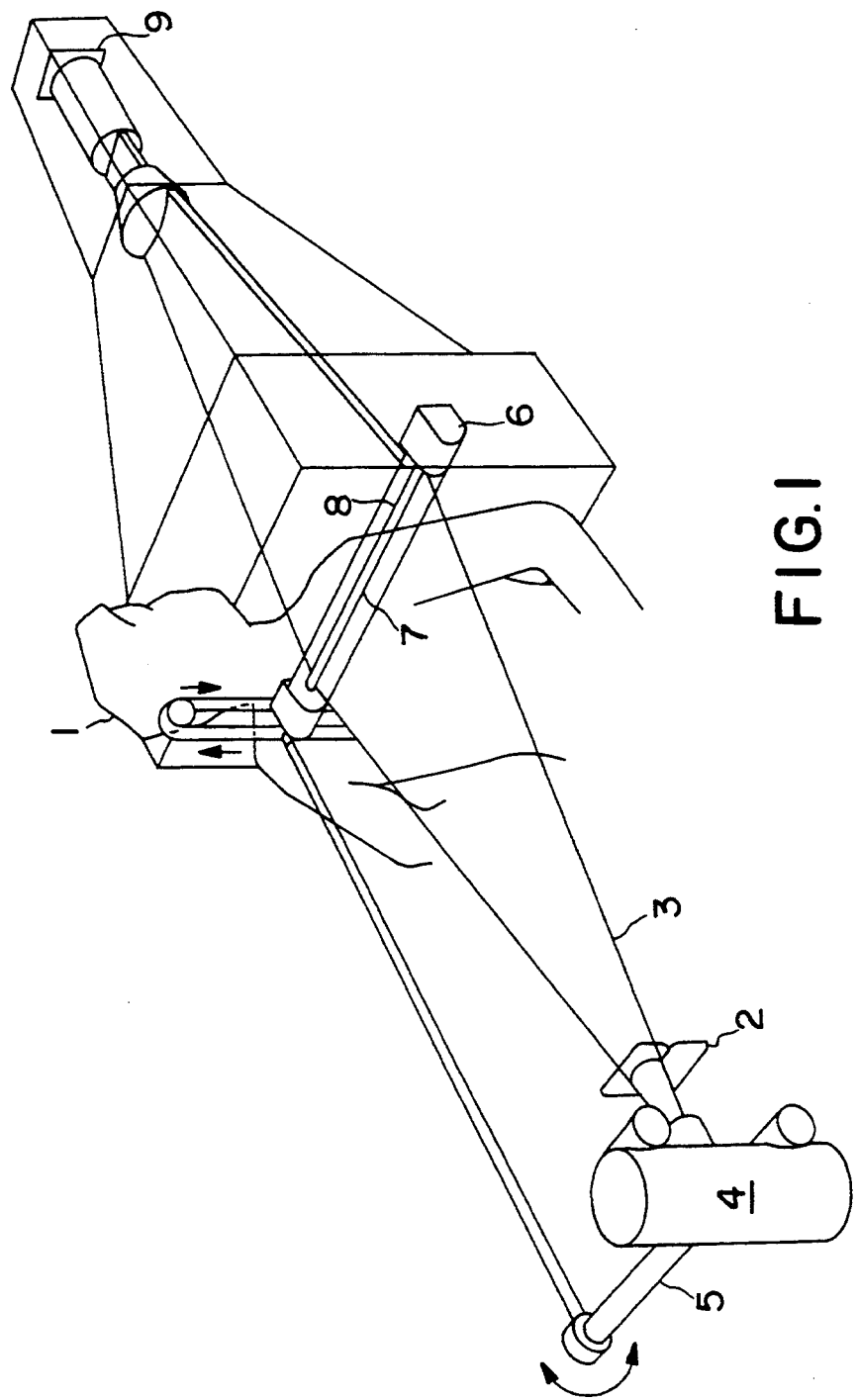
FIG. 1 shows diagrammatically an example of an apparatus in which an image intensifier tube of the proximity-focus type having an oblong cathode and anode is used.

FIG. 1 shows diagrammatically an example of an apparatus in which an image intensifier tube of the proximity-focus type having an oblong cathode and anode is used. The apparatus shown is an apparatus, known per se, for slit radiography in which a part of a patient 1, for example the thorax, is scanned with a flat fan-shaped X-ray beam 3 via a slit diaphragm 2. To this end, an X-ray source 4 can be used which is rotatable about an axis which is parallel to the slit of the slit diaphragm and preferably extends through the X-ray focus of the X-ray source, as shown in FIG. 1.

An image intensifier tube 6 which may, for example, have a cathode 7 and an anode 8 having a length of 40 cm and a height of 2.5 cm is situated behind the patient and is synchronously moved concomitantly with the scanning movement of the X-ray beam in a manner such that, after having passed through the patient, the flat fan-shaped X-ray beam always falls on the cathode of the image intensifier tube. In this application, the cathode is sensitive to X-ray radiation and emits electrons which provide, at the anode side, a visible output image which may be used, for example, to illuminate a photographic plate 9.

It is clear that it is important for the conversion factor of the image intensifier tube to be as uniform as possible over the entire length (and height) thereof.

In this connection, it is pointed out that, in the application shown, a uniform variation of the conversion factor in the longitudinal direction of the tube in particular is important because any irregularities in the height direction are equalized during the formation of the image as a consequence of the scanning movement taking place at right angles to the longitudinal direction.

It is furthermore pointed out that it is advisable in practice to arrange for the conversion factor to increase from the centre of the anode towards the two ends of the anode in order to compensate for the so-called vignetting effect. In this way, a surface, for example, a photographic film, situated at some distance from the anode can be illuminated more uniformly.

It has been found that the theoretically required variation of the output signal of the anode as a function of the position can in practice be approximated by a parabolic curve.

Figure 2A:
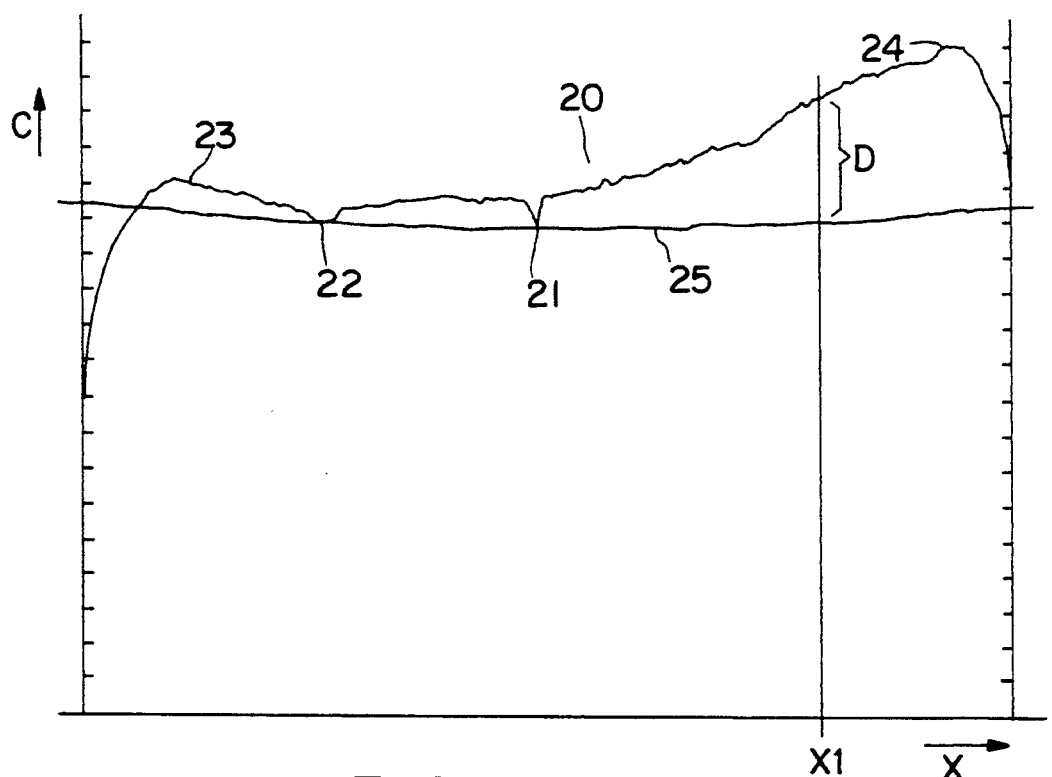
FIGS. 2A and 2B shows diagrammatically two examples of graphs which reproduce the output signal of an oblong proximity-focus image intensifier tube as a function of the distance from one end of the tube for a given input signal.
Figure 2B:
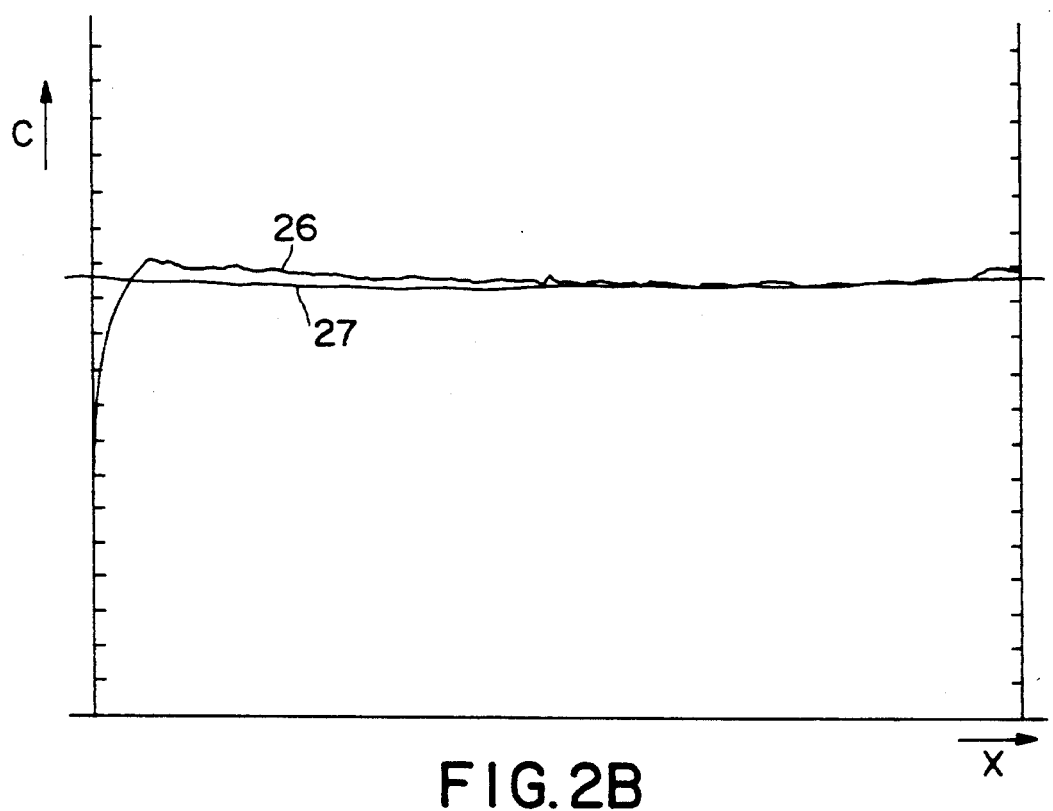

FIGS. 2A and 2B show diagrammatically two graphs which reproduce qualitatively the intensity C of the light provided by the oblong anode as a function of the distance X from one of the ends of the image intensifier tube for a given irradiation of the cathode which is uniform over the entire length.

The curves shown therefore represent the conversion factor as a function of the position on the anode.

The curves shown have been measured with the aid of a photosensitive cell which emits an electrical signal corresponding to the intensity of the incident light in response to incident light. According to the invention, such a cell is moved along the anode in the longitudinal direction of the anode during a uniform irradiation of the oblong cathode and then provides output signals of the type shown in FIG. 2 which are representative of the variation of the conversion factor of the tube.

The required uniform illumination of the cathode preferably takes place via a slit-type diaphragm whose opening extends at right angles to the longitudinal direction of the cathode and is moved in the longitudinal direction of the cathode synchronously with the photosensitive cell at the anode side. In this way, possible measuring errors resulting from the radiation scattering occurring in the tube are essentially avoided.

As will be indicated in still greater detail below, a number of parallel strips extending in the longitudinal direction of the anode at various heights can advantageously be scanned. To this end, use may be made of a single photosensitive cell which is moved consecutively at different heights along the anode, or of a number of cells which each simultaneously scan a strip of the anode. A number of photosensitive cells may, for example, be placed above one another in a holder, which holder is then passed along the anode so that a number of curves of the type shown in FIG. 2 are generated for each tube.

It is pointed out that it is a question of a relative movement. It is therefore also possible to move the tube between, on the one hand, a stationery radiation source and any diaphragm device and, on the other hand, one or more photosensitive elements in a direction corresponding to the longitudinal direction of the anode.

FIG. 2A shows a relatively widely varying curve 20 which has minima at 21 and 22 and which has relative maxima at 23 and 24 which are also considerably different from one another. The conversion factor is therefore too low at 21 and 22 and in fact too high at 23 and 24.

In order to make a correction mask, a required value line is first sought which approximates to the measured curve 20 as well as possible. The required value line represents a desired variation of the conversion factor and could, for example, be a horizontal straight line. As pointed out above, however, a parabolic curve such as shown at 25 in FIG. 2A is preferable.

Since the minima 21 and 22 correspond to positions on the anode which provide a minimum quantity of light, correction with a mask is possible only if the required value line is lower than, or at most equal to, the minima 21, 22 at the position of the minima.

For the same tube, but now provided with a correction mask, FIG. 2B shows by way of example a second experimental curve 26 having a parabolic curve 27 approximating to said curve. It can be seen that the difference between the experimental curve 20 and the associated parabolic curve 25 is appreciably greater than the only slight difference between the experimental curve 26 and the parabolic curve 27.

According to the invention, the desired degree of correction can be obtained for any value of X by attenuating the light provided by the anode in a manner such that the residual light corresponds to the value of the required value line at the relevant value of X.

At a distance $X_1$ from the end of the tube or the anode chosen as the origin, there is a difference D between the experimental curve and the required value line in the case of FIG. 2A. If the value of C associated with $X_1$ is denoted by $C(X_1)$ an attenuation of the light provided by the anode by a factor of $D/C(X_1)$ is therefore needed at the position $X_1$.

Such an attenuation can be obtained in a simple way by using a mask which has an appropriate blackening at the relevant position. In this way, starting from the experimental curve and the required value line, the attenuation required for any value of X, and consequently the required blackening of a correction mask to be manufactured, can be determined.

The measured values are preferably fed to a computer which is then also able to determine the required value line best approximating to the measured value curve and the difference between the measured values and the required values. If coupled to a printer, the computer is then also able to print out an image of a strip-type correction mask which is suitable for correcting the measured strip of the anode. The print-out may be composed in a simple way of a black line which varies in thickness and, depending on the thickness when viewed in height, masks a more or less large section of the measured strip of the anode if it is provided at the correct position in front of the anode window.

The print-out may also be composed of a raster of black dots which vary in thickness. The abovementioned black line which varies in thickness may, moreover, likewise be made up of dots such as is usual when computer printers are used.

Figure 3:
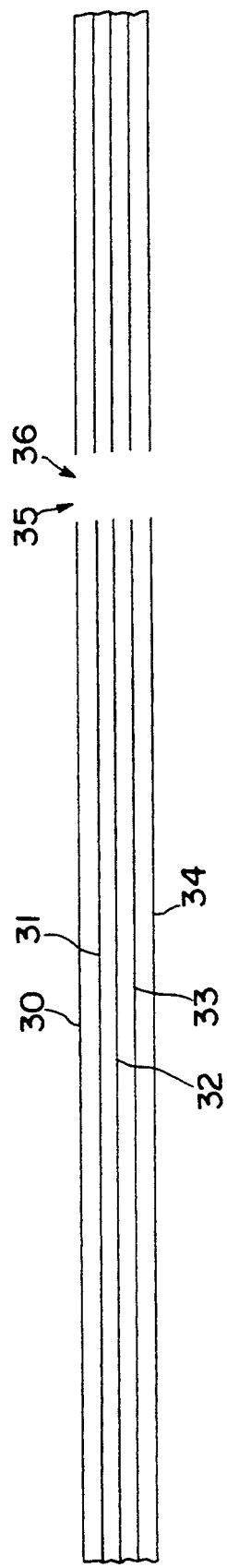
FIG. 3 shows diagrammatically an example of a correction mask for an oblong image intensifier tube.

FIG. 3 shows an example of a mask pattern which has been printed out in the way described and which, in the example shown, is intended to correct five strips 30 to 34 inclusive which extend parallel to one another with a mutual gap in the longitudinal direction of the anode.

The mask pattern can be printed out in a simple manner, for example photographically, in dimensions corresponding to the dimensions of the anode window on a transparent carrier which is suitable for mounting on the outside on the anode window.

The lines shown in FIG. 3 and varying in thickness are broken at 35 and 36. This means that at those positions no correction was necessary. It could also mean that the required value line is too high at those positions, i.e. above the experimental curve, and that the chosen required value line is possibly not the optimum required value line. Which of the two situations occurs can be checked in a practical situation using images of the type shown in FIG. 2.

An image intensifier tube can therefore be corrected relatively simply in the manner described above. In addition, after a certain period of use during which ageing phenomena could occur in the image intensifier tube, the correction mask may be replaced by a more up-to-date mask, so that an expensive image intensifier tube acquires a longer service life.

I claim:

1. A method for manufacturing a correction mask for an image intensifier tube of the proximity-focus type having an oblong cathode and anode, which comprises:
   uniformly illuminating said oblong cathode with cathode sensitive radiation;
   measuring intensity of light on said oblong anode in a narrow strip region extending longitudinally along said oblong anode as a function of distance from an end of said oblong anode;
   plotting a line of said measured values against a line of predetermined values as a function of said distance from said end of said oblong anode; and
   forming a transparent correction mask having blackening of a density representative of a difference between said lines of measured values and said predetermined values as a function of said distance from said end of said oblong anode, said blackening corresponding to said narrow strip region.

2. An oblong image intensifier of the proximity-focus type having an oblong cathode and anode and a correction mask manufactured in accordance with claim 1 and positioned on said oblong anode.

3. The method of manufacturing a correction mask as defined in claim 1 wherein measuring is effected in a plurality of parallelly-disposed narrow strip regions extending longitudinally along said oblong anode.

4. The method for manufacturing a correction mask as defined in claim 3 wherein the measuring of intensity of light provided by said oblong anode is effected in at least two strip-type regions parallel to one another and with a gap and wherein said transparent correction mask is formed with blackening in oblong regions corresponding to said at least two strip-type regions.

5. The method for manufacturing a correction mask as defined in claims 1 or 3 wherein said line of predetermined values is selected at a point near line of predetermined values is selected at a point near each end of said anode corresponding closest to said line of predetermined value.

6. The method for manufacturing a correction mask as defined in claim 1 or 3 wherein said line of predetermined values is a parabolic curve.

7. The method for manufacturing a correction mask as defined in claims 1 or 3 wherein said blackening is formed by a line varying in thickness.

8. The method for manufacturing a correction mask as defined in claims 1 or 3 wherein said blackening is formed by a raster of dots of varying thickness.

9. The method for manufacturing a correction mask as defined in claims 1 or 3 wherein uniformed illumination of said oblong cathode is effected via a slit-type diaphragm extending at right angles to said longitudinal direction of said anode and wherein said slit-type diaphragm and oblong cathode are moved with respect to one another in said longitudinal direction of said oblong cathode.

10. The method for manufacturing a correction mask as defined in claims 1 or 3 wherein said blackening is determined by a computer on the basis of said difference and is printed out by a printer as a line varying in thickness.

11. The method for manufacturing a correction mask as defined in claim 10 wherein said line is formed on a substrate and subsequently transferred photographically to said transparent substrate to form said transparent correction mask.

12. The method for manufacturing a correction mask as defined in claims 1 or 3 wherein intensity of light is measured by a photosensitive cell and said photosensitive cell is moved relatively with respect to longitudinal direction of said oblong cathode.

13. The method for manufacturing a correction mask as defined in claims 9 and 12 wherein said slipped diaphragm and said photosensitive cells are moved synchronously with respect to said oblong cathode or said oblong anode.

14. A method for correcting an image intensifier tube of the proximity-focus type having an oblong cathode and an anode window matching to said oblong cathode, which comprises positioning a strip-type transparent carrier having a oblong region of varying blackening density against said anode window.

* * * * *